US 8,075,779 B2

(12) United States Patent
Mitchell

(10) Patent No.: US 8,075,779 B2
(45) Date of Patent: Dec. 13, 2011

(54) WATER TREATMENT

(75) Inventor: David Mitchell, Yardley, PA (US)

(73) Assignee: Environmental Management Corporation, O'Fallon, MO (US)

(*) Notice: Subject to any disclaimer, the term of this patent is extended or adjusted under 35 U.S.C. 154(b) by 1333 days.

(21) Appl. No.: 11/515,681

(22) Filed: Sep. 5, 2006

(65) Prior Publication Data

US 2008/0053899 A1    Mar. 6, 2008

(51) Int. Cl.
*B01D 61/24* (2006.01)
*C13B 20/16* (2011.01)
*C02F 1/44* (2006.01)

(52) U.S. Cl. ........ 210/650; 210/652; 210/607; 210/601; 210/919; 127/54; 127/55

(58) Field of Classification Search ........... 210/650, 210/652, 295, 601, 607, 321.85, 321.1, 919; 127/54–55
See application file for complete search history.

(56) References Cited

U.S. PATENT DOCUMENTS

| | | | | |
|---|---|---|---|---|
| 2,954,305 A | * | 9/1960 | Grosvenor, Jr. | 127/55 |
| 3,194,683 A | * | 7/1965 | Grosvenor, Jr. et al. | 127/55 |
| 3,799,806 A | * | 3/1974 | Madsen | 127/54 |
| 3,954,605 A | * | 5/1976 | Davies et al. | 210/608 |
| 4,165,289 A | * | 8/1979 | Borst | 210/669 |
| 4,374,865 A | * | 2/1983 | Strobel | 426/599 |
| 4,812,237 A | * | 3/1989 | Cawley et al. | 210/605 |
| 5,273,661 A | * | 12/1993 | Pickett et al. | 210/710 |
| 5,635,071 A | * | 6/1997 | Al-Samadi | 210/652 |
| 5,746,920 A | * | 5/1998 | Boergardts et al. | 210/611 |
| 5,756,141 A | * | 5/1998 | Chen et al. | 426/599 |
| 5,759,283 A | * | 6/1998 | Ekern et al. | 127/42 |
| 5,853,593 A | * | 12/1998 | Miller | 210/652 |
| 6,106,458 A | * | 8/2000 | Ha | 600/187 |
| 6,113,797 A | * | 9/2000 | Al-Samadi | 210/652 |
| 6,338,803 B1 | * | 1/2002 | Campbell et al. | 210/652 |
| 6,555,003 B2 | | 4/2003 | Ferro et al. | |
| 6,592,763 B1 | * | 7/2003 | Benedictus et al. | 210/652 |
| 6,709,527 B1 | * | 3/2004 | Fechter et al. | 127/46.2 |

OTHER PUBLICATIONS

Blocher et al., Recycling of spent process water in the food industry by an integrated process of biological treatment and membrane separation, 2002, Elsevier, Desalination, 144, pp. 143-150.*
Noronha et al., Treatment of spent process water from a fruit juice company for purposes of reuse: hybrid process concept and on-site test operation of a pilot plant, 2002, Desalination, 143, pp. 183-196.*
Examiners First Report on Patent Application No. 2006287661 dated Nov. 25, 2010.

* cited by examiner

*Primary Examiner* — Tony G Soohoo
*Assistant Examiner* — David C Mellon
(74) *Attorney, Agent, or Firm* — Morgan, Lewis & Bockius LLP

(57) ABSTRACT

This invention is directed to an integrated process and system for water treatment, in particular, an integrated process and system for water treatment in the beverage manufacture cycle. The water treatment process is directed to treating an influent water solution, a low sugar concentration solution, and a high sugar concentration solution. The water treatment system is directed to a system for treating an influent water solution, a system for treating a low sugar concentration solution, and system for treating a high sugar concentration solution.

11 Claims, 2 Drawing Sheets

WATER TREATMENT

FIELD OF THE INVENTION

The present invention relates to water treatment and, in particular, to integrated systems for water treatment in the beverage manufacture cycle.

BACKGROUND OF THE INVENTION

Water treatment facilities typically treat three separate streams of water in the beverage industry. That is, each of the influent water from a municipal source, the low brix stream and the high brix stream, is treated separately. In that regard, influent water in the beverage industry is known to be treated with either a cold lime softener, using lime-ferric chloride and anionic flocculent, for hardness and alkalinity removal. Unfortunately, this treatment does not remove sodium in the water, and the sodium concentration must be at a level below approximately 14 parts per million (ppm) for a single serving diet drink. More recently known influent water systems include a nano-filter or reverse osmosis membrane to treat water. While these filters and membranes remove hardness, alkalinity, bacteria, viruses, and monovalent ions from the permeate, these "reject" streams required disposal directly to the sewer system.

Treatment of water for beverages, in which the water supply is taken from municipal influent water has its own particular problems. In particular, potable water used for the processing and which is purchased from the municipality usually possesses a high salt content, especially in areas where salt (sodium) is used on public roadways during inclement weather. In addition, federal law limits the concentration of the sodium that can be in a beverage product. Beverage manufactures typically use potable water to dilute syrups purchased from vendors.

Beverage manufactures are also in need of recovering and reusing the waste streams that result from the manufacture of the beverage products. In certain instances, a plurality of wastewater streams are created, such as a low sugar (low brix) waste stream and a high sugar (high brix) waste stream. The sugar unit of measurement is the "brix", which is an indication of the refractive index or sugar content in a particular composition.

So, for example, a manufacturer that rinses or washes its equipment after preparing a particular beverage, such that same equipment can be used for the manufacture of another beverage, will initiate the washout process. At the beginning, this process will result in a high brix, low volume byproduct. Toward the end of the washout process, the sugar content on the machinery reduces, thereby resulting in a low brix, high volume flow.

The low brix waste stream can be discharged to a municipal waste treatment facility for processing and filtration. The municipality is generally prepared to receive such a waste stream as the municipal waste treatment facility can accommodate a reduced amount of sugar.

The low brix stream is usually treated by discharging it directly to the sewer and accordingly, the facility undertaking such discharge will incur a surcharge based upon a Chemical Oxygen Demand (COD) or BioChemical Oxygen Demand (BOD) loading. Typically, a discharge stream may also contain up to two thousand parts per million (ppm) Total Suspended Solids (TSS), which may similarly incur surcharge. Alternatively, it is known in the art to treat the low brix wastewater with some type of biological system. Such a system may include a fixed film reactor or a suspended growth activated sludge system. A membrane bioreactor may also be used. Thereafter, the treated wastewater from the biological system is then discharged to the municipal waste treatment facility.

Unfortunately, the high brix waste stream cannot be directly discharged to the municipal waste treatment facility, as its existing equipment will typically be unable to treat the high brix (organic pollution related to sugars) from the waste stream. Accordingly, the beverage manufacturer may be required to pay a third party vendor to take the high brix stream and transport it away for subsequent use or processing. This adds tremendous cost and resources to remove the high brix stream.

In contrast, the high brix waste water, if it is segregated from the low brix waste water, is collected in tanks and then removed for disposal to another location, at a substantial fee per gallon, for further handling or discharge in an environmentally acceptable manner.

Such contaminated streams contain sugars, phosphates, etc. The sugar content would inevitably vary considerably depending upon the particular process that had been used. For example, vats and bottling units that are dumped and cleaned may cause a significant spike in the wastewater sugar content. Accordingly, a brix monitor is used to segregate the wastewater stream into both high and low sugar concentrations, or high and low brix streams. A low brix content waste stream is typically approximately less than 0.2 brix or less than 2000 ppm BOD. In contrast, a high brix waste stream typically ranges from one to ten brix and normally between about 2 to 5 brix or 20,000 to 50,000 ppm BOD.

Accordingly, it would be desirable to use and dispose in a recycled manner the streams of sodium, low brix and high brix.

SUMMARY OF THE INVENTION

The present invention treats all the wastewater streams in a fully integrated fashion and to thereby optimize a beverage plant's water cycle for use and reuse.

One embodiment of this invention is for an integrated water treatment process comprising treating an influent water solution, a low sugar concentration solution, and a high sugar concentration solution.

Treating the influent water solution comprises blending an influent water solution with a second membrane treated low brix stream into a first tank to form a first tank blended water stream; passing the first tank blended water stream through a first membrane to form a first membrane treated beverage makeup water and a first membrane treated contaminated solution; passing the first membrane treated contaminated solution to a sewer for disposal; and passing the first membrane treated solution to an analyzer and then further treating/disinfecting with an ozonator to form a substantially pure water solution.

Treating the low sugar concentration solution comprises passing a brix stream of less than about 0.3 brix through a second membrane, a membrane bioreactor, to form a portion of the second membrane treated low brix stream and a second membrane treated concentrated biomass; passing the second membrane treated low brix stream to the first tank to blend with the influent water solution to form the first tank blended water stream; and retaining the second membrane treated biomass in the bioreactor. Periodic disposal of a small volume of biomass to sewer 83 is undertaken to maintain the concentration of bacteria within control limits.

Treating the high sugar concentration solution and suspended solids comprises passing a brix stream of greater than about 0.3 brix through a third tank to form a third tank treated high brix water stream and a third tank treated suspended solids stream. The third tank feeds the third membrane. The third tank can be periodically drained to sewer to drain suspended solids from the system. The third tank high brix water stream is pumped to a third membrane to separate insoluble solids from a membrane treated high sugar permeate; passing the third membrane suspended solids back to blend with the brix stream of greater than about 0.3 brix in the third tank for further treatment; passing the third membrane treated high sugar permeate to a fourth tank followed by treatment in a fourth membrane to form a fourth membrane treated high sugar concentration solution and a fourth membrane treated downstream brix stream; passing the fourth membrane treated downstream brix stream to blend with the low brix stream in the second membrane; passing the fourth membrane treated high sugar concentration solution to a fifth tank forming a fifth tank treated brix stream followed by treatment in a fifth membrane to form a fifth membrane treated high sugar concentration solution and a fifth membrane treated low sugar concentration solution; passing the fifth membrane treated high sugar concentration solution to a sixth tank to form a high sugar concentration product; and passing the fifth membrane treated low sugar concentration solution back to the fourth tank for further treatment.

Another embodiment of this invention is directed to an integrated system for treating water comprising a system for treating a water solution, a system for treating a low sugar concentration solution, and system for treating a high sugar concentration solution.

The system for treating an influent water solution comprises a first tank to store an influent water stream and a second membrane treated low brix stream; a first membrane to form a first membrane treated beverage make up water; and an analyzer to determine the integrity of the first membrane and/or an ozonator to disinfect the first membrane treated beverage makeup water.

The system for treating a low sugar concentration solution comprises a membrane bioreactor which encompasses a tank with a second membrane. The second membrane permeate flows to the first tank and the second membrane retained biomass is returned to the tank (associated with the second membrane) which is aerated to allow the bacteria to metabolize sugars.

The system for treating a high sugar concentration solution comprises a third tank to form a third tank treated high brix water stream and a third tank treated suspended solids stream; a third membrane to form a third membrane treated high sugar permeate (with same content but free of solids) and a third membrane treated high suspended solids retentate; a fourth tank for storing a portion of the fourth membrane treated high sugar concentration solution (with no solids) and a portion of the fifth membrane treated low sugar concentration solution; a fourth membrane to form a fourth membrane treated high sugar concentration solution and a fourth membrane treated downstream brix stream; a fifth tank for storing the fourth membrane treated high sugar concentration solution; a fifth membrane to form a fifth membrane treated high sugar concentration solution and a fifth membrane treated low sugar concentration solution; and a sixth tank to store a high sugar concentration product.

In an embodiment, treating a high sugar concentration further comprises an online conductive analyzer positioned downstream from the fourth membrane. The first membrane comprises a reverse osmosis membrane. The second membrane comprises a membrane bioreactor. The third membrane comprises an ultrafilter membrane. The fourth membrane comprises a spiral reverse osmosis membrane. The fifth membrane comprises a flat sheet reverse osmosis membrane.

This invention generates three separate streams and utilizes the optimum treatment technology specifically for each individual stream and then integrates the entire treatment water cycle. Consequently, water with the highest contamination is treated and cascaded to the stream of better water quality (lowest contamination).

The present invention includes the integration of the treatment for the entire plant's water cycle (i.e., influent and wastewater and maximizing the amount of wastewater that is recycled in to the production of beverage, cola or bottled water for consumption).

Accordingly, the present invention provides the following:
1. The influent reverse osmosis membrane permits a facility, such as a beverage manufacturer, to manufacture bottled water and because sodium is removed, to approximately less than about 14 ppm, diet drinks can also be produced.
2. Up to about 90% of the low brix and high brix water volume may be recycled. This reduces effluent sewer cost associated with water volumes discharged from the plant and also reduces influent water costs.
3. The treatment of the low brix wastewater stream allows surcharges resulting from disposal thereof to be minimized or eliminated that would otherwise be commonly incurred.
4. The segregation of low brix and high brix streams from each other avoids stress upon the low brix system and reduces the "footprint" of the membrane bioreactor. That is, the segregation reduces the size of both of the tank and the UF membrane, and accordingly, reduces capital and operating costs for the membrane bioreactor. This type of segregation requires that online brix monitors be used during the integrated process.
5. Segregation of low and high brix streams encourages a specific design concept for both the low and high brix streams and integration in the influent water treatment system, thus enabling a "fully integrated" design to be implemented.

Currently, a common treatment of the brix stream involves its removal off site (at approximately $0.049/gallon). The present invention may eliminate this surcharge and generates a by-product with a commercial value. For example, a high brix by-product may be in the form of a high brix dairy cattle feed that can be sold commercially at approximately 15-20 dollars per ton.

Treatment of the high brix stream and the presence of the membrane bioreactor at the low brix stream allows the high brix stream permeate to be pumped to the membrane bioreactor influent and thus maximizes water recovery. For example, the cost savings of recycling an additional 40,000 gallons per day (gpd) may represent an annual cost savings of $80,000/yr.

Thus the following steps are followed:
Step 1: Process washdown water is separated into low and high brix.
Step 2: High brix is treated and the sugars are hauled off site as a valued by-product. The water cascades to the low brix.
Step 3: Low brix and water from high brix is treated and treated water cascades to the influent reverse osmosis.
Step 4: Municipal water and treated low brix is treated by reverse osmosis and disinfected.
Step 5: Disinfected water is used in the beverage product.
Step 6: The entire process is repeated when there is a product changeover.

BRIEF DESCRIPTION OF THE DRAWING

For a more complete understanding of the present invention, reference may be had to the following drawing, taken in conjunction with the detailed description, of which.

The features of the present invention and operation thereof, including process, are discussed below with reference to the attached FIGS. 1 and 2. The numerals in the figures are the same for the common elements.

DETAILED DESCRIPTION OF PREFERRED EMBODIMENTS

Brix is a refractive index measurement. In essence, it measures sugar content, which is also related to the wastewater discharge parameter, BOD.

The present water treatment concept has a number of purposes. These are primarily used to treat waste process water (low and high brix) so that the sugar in the low brix stream are removed, and in the sugar concentration in the high brix stream is further concentrated (approximately 10 times further concentrated) so the high brix stream can be disposed of as a useful byproduct, for example as a cattle feed revenue stream.

Figure 1:
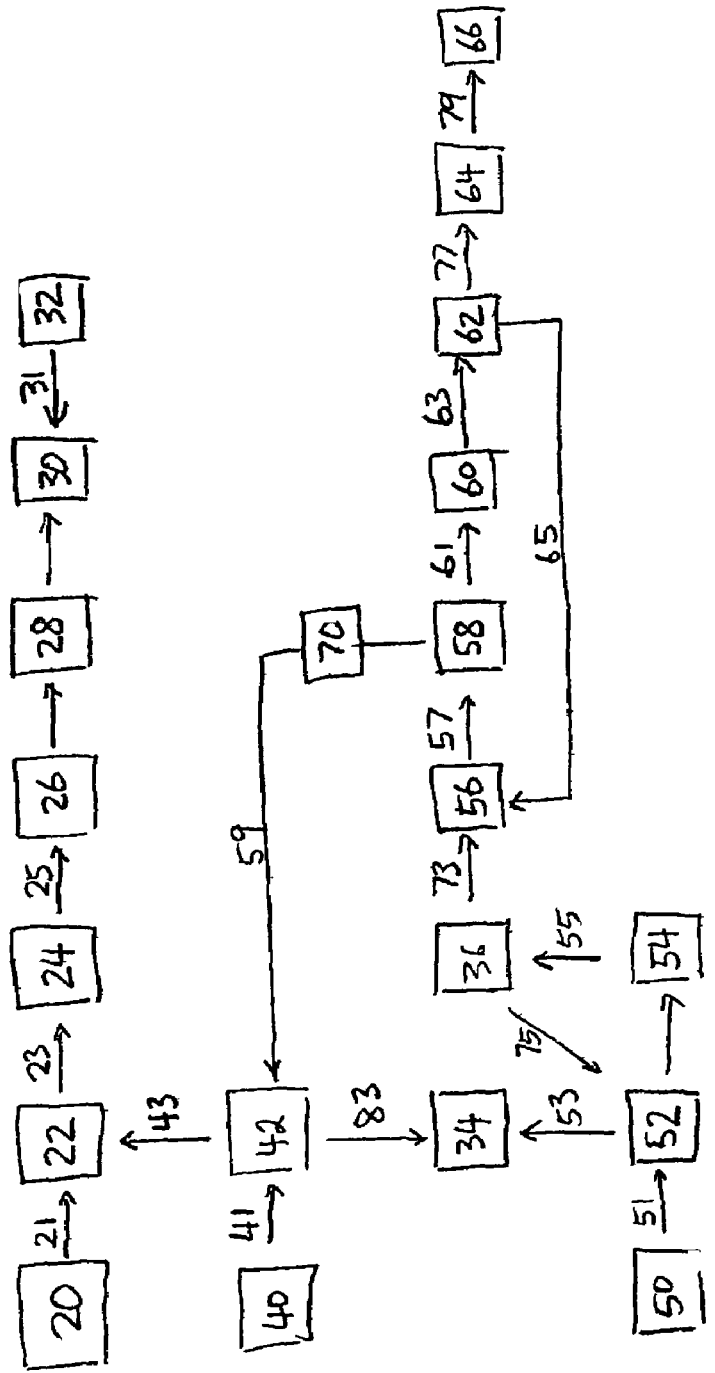
FIG. 1 discloses the integrated water treatment process of the invention.

Referring to FIG. 1, in a system 10 for treating water in the beverage industry, municipal water 21 contains dissolved contaminants that must be removed for it to be suitable as a raw material for manufacturing beverages. These contaminates consist of hardness (calcium and magnesium), sodium and alkalinity. The municipal water 21 from municipal water source 20 enters first tank 22, where it is blended with the membrane permeate 43 from second membrane 42. The blended water stream 23 then flows from first tank 22 to first membrane 24, which is a reverse osmosis unit. First membrane 24 separates the above contaminants from stream 43 (hardness, sodium, alkalinity and any BOD due to low molecular weight organics) that managed to pass through second membrane 42, as well as municipal water 21, both combined as blended stream 23.

The low and high brix solutions contain sugar that is washed from certain process equipment (not shown) during flavor changes, etc. The online monitors separate the flows according to the sugar content. A low brix source 40 feeds a low brix stream 41 or a downstream brix stream 59 from a high brix source 50. Either streams 41 and 59, having a brix concentration below about 0.3 brix, is diverted to second membrane 42. A low brix membrane bioreactor (MBR) in second membrane 42, which consists of a large tank (e.g. >100,000 gallons) with either an internal or external membrane to separate active bacteria degrading sugars from clean water. The MBR can be replaced by another reverse osmosis unit but the water recovery would be less. The MBR in this particular design was an external ultrafilter MBR. The MBR maximizes water recovery and a low brix permeate stream 43 is then recycled to first tank 22. Up to about 98% of the water entering second membrane 42 is recycled to first tank 22, as opposed to up to about 80% if it was a reverse osmosis design. Depending upon the municipal water availability, and municipal and wastewater disposal costs (per 1000 gallons of per meter cubed), this can be a significant annual monetary and societal cost savings.

The MBR contains bacteria that destroy the brix (sugars) and convert them to carbon dioxide and water, or smaller organic molecules. The bacteria is kept in the system (aerated tank) by the membrane (typically a microfilter or ultrafilter membrane) which can be located either internally or externally to the tank that accepts the influent low brix flow. Consequently, bacteria and sugars do not contaminate the beverage. Any small organics that permeate through the ultrafilter membrane are removed by first membrane 24. The water that permeates through first membrane 24 is the beverage makeup water 25. Such water is extremely pure since it has passed through a reverse osmosis membrane. A reverse osmosis membrane separates bacteria and viruses. However, since defects, such as a hole or unforeseen malfunction, could occur with first membrane 24, there are on-line conductivity analyzers and on-line total organic carbon analyzers 26 to insure that the integrity of the membrane was not compromised. These analyzers 26 are located on the influent to second tank 30. In addition, there is an ozonator 28 that pumps ozone into second tank 30. The ozonator 28 will disinfect (destroying any bacteria or virus passing in) the beverage makeup water 25 that managed to pass through first membrane 24 and is an additional safety precaution. If this did happen, then the affected reverse osmosis unit (first membrane 24) would automatically shut down and an alarm would notify the operator of the unwanted presence of bacteria or virus. In an embodiment, first membrane 24 comprises two reverse osmosis units, each treating half of the flow from the first tank 22. The beverage makeup water 25, after undergoing treatment in analyzer 26 and ozonator 28 is then stored in second tank 30. A water storage tank 32 also provides a clean water stream 31 into second tank 30.

A low or high brix solution 51 having a concentration of above about 0.3 brix is passed from high brix source 50 to the high brix third tank 52, forming high brix water stream 71, which is then pumped through an ultrafilter third membrane 54. Any suspended solids from stream 55 is removed to protect fourth membrane 58 and fifth membrane 62, which are spiral and flat sheet reverse osmosis units, respectively. A portion of the permeate 73 from third membrane 54 is advanced to fourth membrane 56, while another portion of the permeate 75 is returned to third tank 52 for further treatment through third membrane 54. Controlling valve 36 directs the flow of permeate 73 and permeate 75 by the relative sugar concentration of these two permeates. Fourth tank 56 feeds the spiral reverse osmosis fourth membrane 58 through stream 57, which concentrates the brix from about 3.0 to about 20 brix. On-line conductivity analyzer 70 located on the permeate 59 between fourth membranes 58 and second membrane 42 ensures the integrity of the fourth membrane 56. The permeate (downstream brix stream) 59 which, consists primarily of water from fourth membrane 58, is pumped to second membrane 42 for polishing before it is in turn further purified by first membrane 24. The sugar solution 61 which is rejected by fourth membrane 58 is pumped to fifth tank 60, forming stream 63, and from there to the flat sheet disc membranes of fifth membrane 62. Here, a portion of the sugar solution 77 is concentrated further from about 20 brix to about 30 brix, while the sugar water solution 65 that passes through fifth membrane 62 is recycled to fourth tank 56 for another opportunity to recover these sugars and water.

The sugar solution formed from fifth membrane 62 is pumped to sixth tank 64. The resultant concentrated sugar solution is stored before shipping off site where it may be sold at market value, as determined by the sugar content. This is about 30% and is worth approximately $15-20/ton.

There are three sewer outfalls from first membrane 24 through stream 81, second membrane 42 thorough stream 83 and third tank 52 through stream 53. However, up to about 90% of the total amount of waste process water, which would be discharged as wastewater, is treated and recycled in the beverage product.

The high brix waste stream can be filtered and used as a high sugar feed for livestock. With the water removed, and the resultant high sugar solution used for livestock feed 66, the resulting water is easy to recycle by the municipal waste treatment facility through sewer 34.

Figure 2:
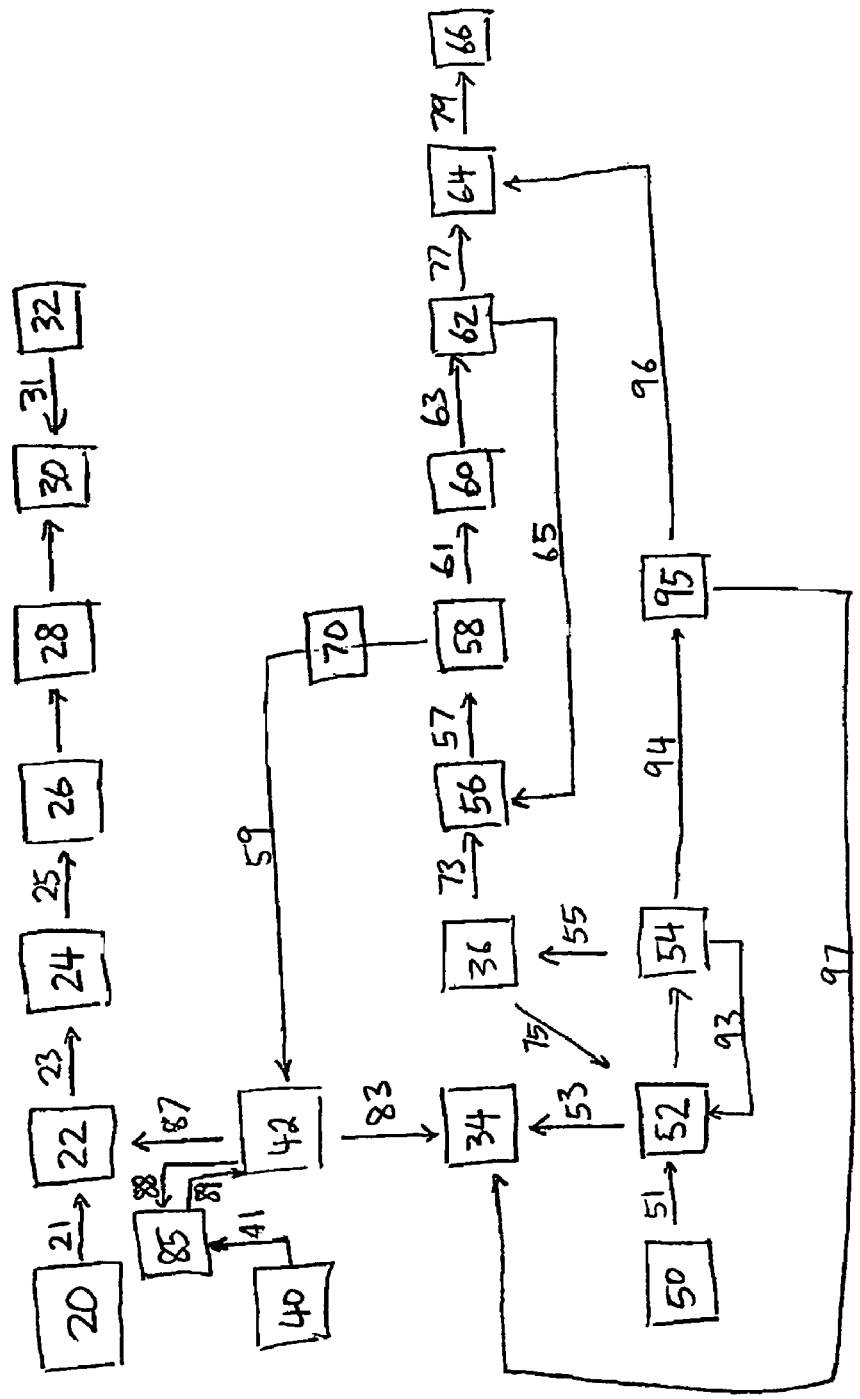
FIG. 2 discloses another embodiment of the integrated water treatment process of the present invention.

In FIG. 2, another embodiment is provided. Low brix stream 41 is diverted to seventh tank 85, then resulting low brix stream 89 passes to second membrane 42. Biomass or retentate stream 88 is returned to seventh tank 85 for further processing. Permeate stream 87 is passed to first tank 22.

Further, retentate stream 93 from third membrane 54 passes to third tank 52 to combine with permeate stream 75 and high brix supply stream 51 for passing streams 53 and 71. A further retentate stream 94 passing from third membrane 54 passes to eighth tank 95. Retentate streams 96 containing suspended solids from eighth tank 95 is drained to sewer 34. Retentate stream 97 containing suspended solids from eighth tank 95 is also drained to sixth tank 64 to be combined with cattle feed 66.

By initially segregating the bottling machine washdown water, the high brix concentration solution and the low brix concentration solution, and selecting different types of membrane systems for a specific purpose and water chemistry that it must treat, the volume of wastewater is reduced from the plant by up to about 90% and substantially eliminating wastewater pollution.

It will be understood that the embodiments described herein are merely exemplary and that a person skilled in the art may make many variations and modifications without departing from the spirit and scope of the invention. All such modifications and variations are intended to be included within the scope of the invention as described in the present description. It should be understood that embodiments described above are not only in the alternative, but may be combined.

What is claimed is:

1. An integrated water treatment process comprising:
   treating a water solution, a low sugar concentration solution, and a high sugar concentration solution,
   wherein treating the water solution comprises:
      blending an influent water solution with a second membrane treated low brix stream into a first tank to form a first blended water stream;
      passing the first blended water stream through a first membrane to form a first membrane treated beverage makeup water and a first membrane treated contaminated solution;
      passing the first membrane treated contaminated solution to a sewer for disposal; and
      passing the first membrane treated beverage makeup water to an analyzer and/or an ozonator to form a substantially pure water solution,
   wherein treating the low sugar concentration solution comprises:
      passing a brix stream of less than about 0.3 brix through a second membrane to form at least a portion of the second membrane treated low brix stream and a second membrane treated contaminated solution;
      passing the at least a portion of the second membrane treated low brix stream to the first tank to blend with the influent water solution to form the first blended water stream; and
      passing the second membrane treated contaminated solution to the sewer for disposal, and
   wherein treating the high sugar concentration solution comprises:
      passing a brix solution of greater than about 0.3 brix through a third tank to form a third tank treated high brix water stream and a third tank treated contaminated solution;
      passing the third tank treated contaminated solution to the sewer for disposal;
      passing the third tank treated high brix water stream to a third membrane to form a third membrane treated high sugar retentate and a third membrane treated low sugar permeate;
      passing the third membrane treated low sugar permeate back to blend with the brix stream of greater than about 0.3 brix in third tank for further treatment;
      passing the third membrane treated high sugar retentate to a fourth tank forming a fourth tank treated brix stream followed by treatment in a fourth membrane to form a fourth membrane treated high sugar concentration solution and a fourth membrane treated downstream brix stream;
      passing the fourth membrane treated downstream brix stream to blend with the brix stream of less than about 0.3 brix in the second membrane;
      passing the fourth membrane treated high sugar concentration solution to a fifth tank forming a fifth tank treated brix stream followed by treatment in a fifth membrane to form a fifth membrane treated high sugar concentration solution and a fifth membrane treated low sugar concentration solution;
      passing the fifth membrane treated high sugar concentration solution to a sixth tank to form a high sugar concentration product; and
      passing the fifth membrane treated low sugar concentration solution back to the fourth tank for further treatment.

2. The water treatment process of claim 1, wherein the first membrane comprises a reverse osmosis membrane.

3. The water treatment process of claim 1, wherein the second membrane comprises a membrane bioreactor.

4. The water treatment process of claim 1, wherein the analyzer comprises an on-line conductivity analyzer and an on-line total organic carbon analyzer to verify the integrity of the membrane.

5. The water treatment process of claim 1, wherein the third membrane comprises an ultrafilter membrane.

6. The water treatment process of claim 1, wherein the fourth membrane comprises a spiral reverse osmosis membrane.

7. The water treatment process of claim 1, wherein the fifth membrane comprises a flat sheet reverse osmosis membrane.

8. The water treatment process of claim 1, wherein up to 90% of the low sugar concentration solution and high sugar concentration solution is recycled.

9. The water treatment process of claim 1, wherein the high sugar concentration product is a cattle feed.

10. The water treatment process of claim 1 further comprising:
    passing the substantially pure water solution to a second tank; and
    passing a clean water stream from a water storage tank into the second tank.

11. The water treatment process of claim 1, wherein the first membrane is a reverse osmosis membrane, the second membrane is a membrane bioreactor, the third membrane is an ultrafilter membrane, the fourth membrane is a spiral reverse osmosis membrane and the fifth membrane is a flat sheet reverse osmosis membrane.

* * * * *